Sept. 6, 1960 R. N. LAHDE 2,951,377
INTEGRATING RATE GYROSCOPE
Filed July 23, 1958 2 Sheets-Sheet 1

INVENTOR.
REINHARD N. LAHDE
BY
ATTORNEY

Sept. 6, 1960     R. N. LAHDE     2,951,377
INTEGRATING RATE GYROSCOPE

Filed July 23, 1958                                                     2 Sheets-Sheet 2

INVENTOR.
REINHARD N. LAHDE
BY
ATTORNEY

United States Patent Office 2,951,377
Patented Sept. 6, 1960

2,951,377
INTEGRATING RATE GYROSCOPE

Reinhard N. Lahde, Tarzana, Calif., assignor, by mesne assignments, to Curtiss-Wright Corporation, a corporation of Delaware Filed July 23, 1958, Ser. No. 750,435

6 Claims. (Cl. 74—5.6)

This invention relates to gyro-controlled angle indicating systems and more particularly, to an improved integrating rate gyroscope for indicating angular deviation from a given direction.

Present day angle indicating gyroscope systems are mainly of two types: first, a free gyroscope which will approximately maintain a fixed position in space regardless of changes in direction in the vehicle in which it is carried; and second, integrating gyroscopes which will include either mechanical or electrical integrating systems for providing an indication of the total angular deviation of a vehicle carrying the device.

The gyroscope proper employed in the above systems is mounted in gimbals, thus requiring caging or other restoring apparatus. Such gyroscopes are also subject to tumbling, a phenomenon which ordinarily limits their possible angular range of attitude to something less than 90 degrees unless a very complicated and sensitive gimbal arrangement is chosen. The detecting and indicating systems usually associated with these gyroscopes employ amplifiers and other electrical components for providing the desired information. As a consequence of the foregoing, present day systems are not only relatively sensitive to shock and the like, but are also complicated, expensive to manufacture, and require considerable maintenance.

Bearing the above in mind, it is a primary object of the present invention to provide a novel integrating rate type gyroscope system which is extremely simple and rugged compared to present day systems.

More particularly, it is an object to provide a gyroscope mechanism of the above type which does not require complicated gimbals, amplifiers, or other electronic components, and which requires only one basic adjustment.

Another important object is to provide an integrating rate gyroscope meeting the foregoing objects which will indicate angular rates and integrate such rates about one or more axes simultaneously.

Still another object of the present invention is to provide an attitude indicating gyroscope which is not subject to tumbling and which is inherently capable of indicating very large attitude angles.

These and many other objects and advantages of the present invention are attained by providing a simple flywheel mounted for rotation about a given axis which may be aligned with a contemplated direction of travel. The mounting of the flywheel is accomplished by a flexible diaphragm member such that the actual axis of rotation of the flywheel can deviate in direction from the referred to given axis, the flexible mounting exerting a restoring moment tending to realign the axis of rotation with such given axis. Integrally connected to the flywheel is a member having a curved engaging surface facing in the direction of the given axis and having a center of curvature coinciding with the center of gravity of the flywheel.

An indicating wheel is mounted for rotation about an axis normal to the given axis and is provided with a smooth periphery in engagement with a point on the curved surface of the member secured to the flywheel. The engagement point between the indicating wheel and the curved surface of the member secured to the flywheel falls on the given axis and therefore has zero speed if the device is not subjected to an angular rate. When an angular rate exists, the axis of rotation of the flywheel tends to deviate from the direction of the given axis; therefore, the indicating wheel will then engage with a point of the curved surface having a speed proportional to the angular rate to which the device is subjected. The total angle of the indicating wheel itself therefore becomes proportional to the total angle to which the device has been subjected, and thereby becomes an attitude indicator.

In a second embodiment, a sphere is substituted for the indicating wheel and supported in a manner such that it is free to rotate about different diametric axes so that a simultaneous indication of angular deviation about more than one axis is achieved.

The sphere may be supported by wheels which may be used to drive pickups to indicate the displacement components in a particular axis as desired. The angular deviation of the axis of the flywheel from the given axis may also be depicted for a remote indication of angular rate about any axis desired.

To properly operate the device as an attitude indicator in an aircraft, for example, a controllable bias arrangement for remote correction of the displacement angles shown or for remote erection may be provided. Also a gravity controlled erection system may be included.

A better understanding of the invention will be had by referring to the accompanying drawings in which.

Figure 1:
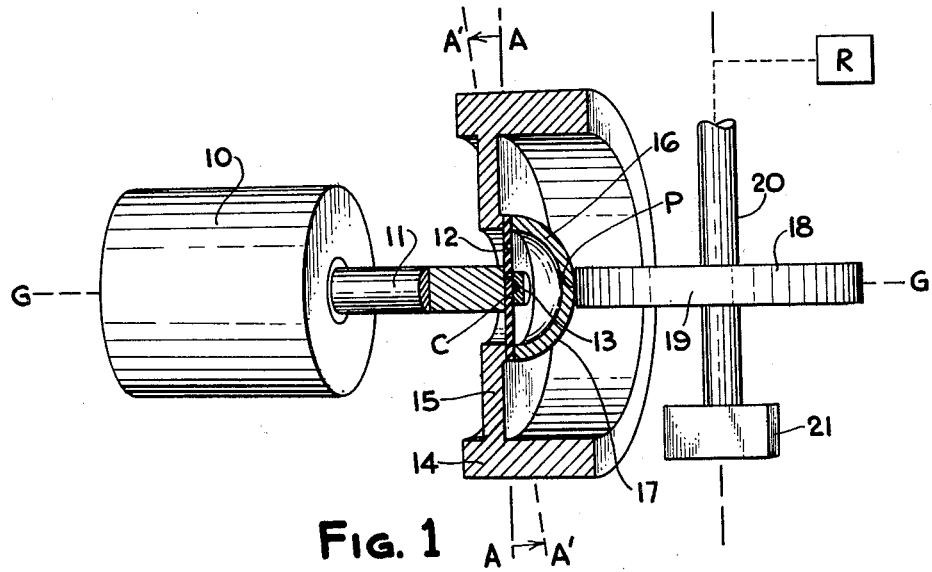
Figure 1 is a schematic partially cut-away perspective view of a first embodiment of the invention.

Referring first to Figure 1, there is shown a motor 10 and a shaft 11 arranged to be rotated at a relatively high speed. A flexible mounting means in the form of a disc-shaped diaphragm 12 is secured to the end of the shaft 11 at 13. The diaphragm 12 serves to support a flywheel 14. The arrangement is such that rotation of the shaft 11 will result in a rotation of the flywheel 14 about an axis corresponding with the axis of the shaft 11 provided the device is not subject to any angular rates. This axis is indicated in Figure 1 as G—G and is hereinafter referred to as the given axis.

As shown in Figure 1 a member 16 is secured to one face of the flywheel 14 and is provided with a smooth curved surface 17, hemispherical in shape and having a center of curvature coinciding with the center of gravity C of the flywheel. Cooperating with the member 16 is an indicating wheel 18 having a smooth periphery 19 in engagement with the curved surface 17 as at the point P. The wheel 18 is mounted on a shaft 20, in turn rotatably supported in a bearing housing 21. The degree of movement of the shaft 20 and thus the wheel 18 may be recorded or otherwise indicated by a suitable readout network indicated schematically in Figure 1 at R.

In operation, the mechanism is normally positioned on a missile or other vehicle with the given axis G—G in alignment with the desired direction of travel of the missile. The point of contact P between the wheel 18 and curved surface 17 normally falls on this given axis G—G and therefore even with the flywheel 14 rotating at a rapid rate, the point P will have zero speed and the wheel 18 will remain stationary.

If now the missile is subject to an angular acceleration tending to turn it, together with the axis G—G, from its straight line direction of travel, the flywheel 14, as a consequence of its gyroscopic properties, will tend to remain in a fixed position in space. Because of the flexible diaphragm mounting, however, the flywheel will be subject to a torque tending to move its axis of rotation into alignment with the new direction of travel of the missile, that is, into coincidence once again with the given axis G—G. This torque acting on the flywheel will cause the same to precess or turn in a direction at right angles to the direction of the angular deviation. For example, if the angle of deviation lies in a plane normal to the plane of the drawing, the restoring torque will result in the flywheel tending to shift its position from the line A—A to the new line A'—A' lying in the plane of the drawing.

Movement of the flywheel to this new position will result in the point of engagement P shifting downwardly such that the new point has a speed which is proportional to the deviation from the position A—A to the position A'—A' and thus the wheel 18 will be caused to rotate at a rate also proportional to this deviation.

When the deviation or turning of the missile has ceased the restoring forces established by the flexible diaphragm will result in the flywheel 14 again realigning its axis of rotation with the given axis G—G such that the point P drops to zero speed and the wheel 18 stops. It will be immediately evident, accordingly, that the total arc or degree through which the wheel 18 has moved will be proportional to the degree or angle through which the missile has been turned from its initial direction.

It will be evident from the foregoing description of the embodiment shown in Figure 1 that the device will only be sensitive to angular deviations in a plane normal to the plane of the drawings, that is, to angular deviations to the left or right if the mechanism is mounted in the horizontal position illustrated and the forward direction corresponds to the axis G—G.

Figure 2:
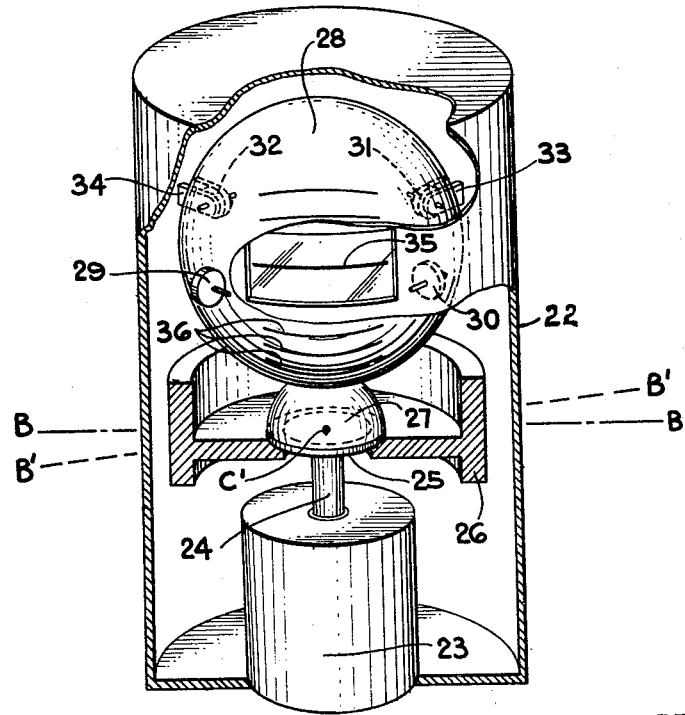
Figure 2 is another schematic partially cut-away perspective view of a second embodiment.

In Figure 2, there is illustrated a device operating on the foregoing principles which will enable the angular rate about two mutually perpendicular axes to be indicated or recorded simultaneously, for example, pitch and roll. As shown in Figure 2, this device comprises an outer casing 22 supporting in its lower end a motor 23 driving a shaft 24 secured through the medium of a flexible mounting 25 to a flywheel 26. As in the embodiment of Figure 1 the flywheel 26 is provided with a member 27 having a curved hemispherical surface, the center of curvature of which coincides with the center of gravity C' of the flywheel.

Rather than an indicating wheel, there is provided in Figure 2 a sphere 28 resting on the hemispherical surface 27 in point contact therewith. The sphere 28 is held in position but nevertheless is free to rotate about any diametric axis in a horizontal plane by small rollers 29, 30, 31, and 32. These rollers in turn, may be mounted to the exterior casing 22 as, for example, by trunnions 33 and 34. The front of the casing may be provided with a window including a horizontal reference line 35 for observing this sphere. The face of the sphere itself in turn may be provided with latitude reference marks 36.

In the operation of the device shown in Figure 2 the flywheel 26 is rotated and in the absence of any angular accelerations the sphere 28 will remain stationary since its point of contact with the hemispherical surface 27 will have zero speed. If now the mechanism is subject to an angular deviation, for example in a plane perpendicular to the plane of the drawing, the axis of rotation of the flywheel 26 will tend to remain in a fixed position and thus the flywheel will be subject to a restoring moment by the flexible diaphragm 25. This moment will cause a precession or shifting of the flywheel in the plane of the drawing, for example from the position indicated by the line B—B to a new position indicated by the line B'—B'.

As a consequence of the above, the point of contact between the sphere 28 and the hemispherical surface 27 will shift and will have a speed proportional to the angular deviation to cause the sphere to rotate about one of its diametric axes. Such angular deviation will be indicated by a translation of the reference lines 36 up or down with respect to the reference line 35 on the casing. Similarly, an angular deviation in the plane of the drawing will result in a tilting of the reference lines 36 with respect to the fixed line 35 on the window of the casing 22. Because of the provision of a sphere and the mounting therefor enabling free rotation about any one horizontal diametric axis, it will be evident that the angular deviation about two mutually perpendicular axes may be simultaneously indicated.

Figure 3:
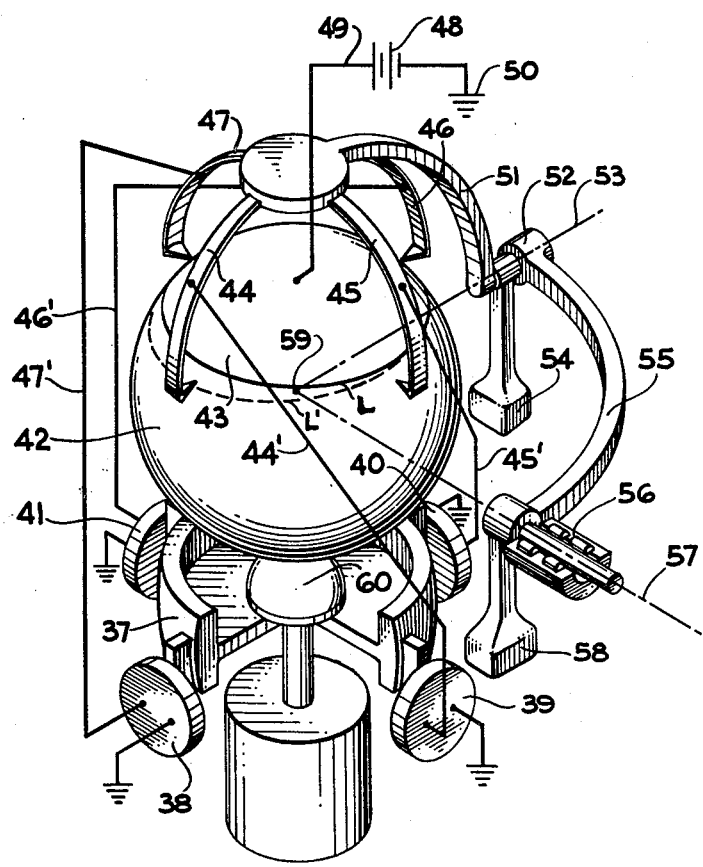
Figure 3 is a view similar to Figure 2 showing one type of gravity erection means.

Referring now to Figure 3 there is shown a further embodiment of the invention similar to Figure 2 but including a gravity erection system. In Figure 3 the flywheel 37 can be caused to tilt about any desired axis by means of electromagnets 38, 39, 40 and 41, spaced circumferentially 90° about the periphery of the flywheel and slightly below the horizontal plane of the flywheel. Any one, or a combination of the magnets, may be energized to provide a biasing torque on the flywheel, thus enabling remote correction.

In the embodiment shown in Figure 3 the magnets are arranged to be energized by a gravity erection system so that the missile body carrying the apparatus may, for example, be automatically maintained in a level attitude with respect to the earth's horizon.

One way of realizing this desired gravity erection system is to provide a modified type sphere indicated as 42 in Figure 3 having an upper surface portion 43 coated with a conductive film. The lower edge of this film defines a latitude line L on the sphere between the equator and upper pole and the remaining surface of the sphere constitutes an insulating surface. Four conducting arms 44, 45, 46 and 47 are arranged to contact the sphere at 90° spaced points immediately below the latitude line L defining the termination of the conducting coating 43. Each of these contact arms may be electrically connected through leads 44', 45', 46' and 47', respectively, to the electromagnets 39, 40, 41, and 38.

A battery 48 supplies a constant potential through a lead 49 to the conductive coating 43. The other side of the battery is grounded at 50 as are also one of the two conductors from each of the electromagnets.

By this arrangement, and if the conducting arms are held stationary with respect to the casing, for example, any tilting of the sphere will result in one of the contact arms engaging the conducting portion. For example, if the sphere tilts forward as indicated by the dotted line L' in Figure 3, the contact arm 44 will engage the conducting portion and thus energy from the battery 48 will pass through conductor lead 49, surface 43, contact arm 44, and lead 44' to energize the electromagnet 39. Energizing of the magnet 39 will establish a torque in the flywheel 37 tending to tilt this flywheel to the right. This latter movement in turn will cause the sphere to rotate about a diameter substantially in the plane of the arms 45 and 47 to move it from the dotted line latitude position to its original position. Movement back to its original position will break the contact between contact arm 44 and the conducting portion 43, thereby de-energizing the magnet 39. The other contact arms and associated magnets operate on a similar principle and it will also be evident that two magnets could be energized simultaneously to cause a rotation of the sphere about an axis at 45° to the above mentioned axis.

As a consequence of the foregoing action, the sphere can be erected with respect to the casing. On the other hand, if it is desired to erect the sphere with respect to gravity, rather than support the contact arms to the casing, these arms may be supported by a system employing pendulums.

This latter system, illustrated in Figure 3, includes a first support arm 51 which extends from the contact arms in an arc to terminate in a first pivot 52, permitting swinging movement of the arm about an axis 53. This axis is positioned to pass through the center of the sphere if extended. A first pendulum 54 is rigidly secured to the first support arm 51 and depends downwardly.

The first pivot 52 is supported at the end of a second support arm 55 curving in azimuth as viewed in Figure 3 to terminate in a second pivot 56 permitting swinging movement of the second support arm 55 about a second pivot axis 57 at right angles to the first pivot axis 53 and passing through the center of the sphere 42 if extended. A second pendulum 58 is rigidly secured to this second support arm and depends downwardly.

By the above described arrangement, the first and second pendulums will maintain the contact points at the ends of the contact arms in a horizontal plane, that is a plane normal to the direction of the gravitational field. Thus, tilting movements of the sphere will cause energization of the appropriate magnets to erect the sphere to a position in alignment with the gravitational field.

To insure a reliable contact pressure between the sphere 42 and the hemispherical surface secured to the flywheel, this hemispherical surface designated 60 in Figure 3 may comprise one pole of a magnet and the sphere 42 provided with a magnetic attracting surface. Thus, even under rugged conditions a reliable contact between the hemispherical surface and sphere is assured.

While a suitable biasing arrangement, as well as an erection system, has been described only in connection with the embodiment shown in Figure 3, it will be evident that such can be employed in the embodiment of Figure 2 and also a modified version thereof could be used in the embodiment of Figure 1. Moreover, it is possible to make the hemispherical surfaces 17 and 27 of Figures 1 and 2 of magnets and incorporate magnetic material in the wheel 18 or sphere 28, to provide a contact pressure between the sphere or wheel and hemispherical surface.

Accordingly, while only certain embodiments have been disclosed, it will be evident that many further variations and modifications falling within the scope and spirit of this invention will occur to those skilled in the art. The integrating rate gyroscope system is, therefore, not to be thought of as limited to the specific examples chosen for illustrative purposes.

What is claimed is:

1. An integrating rate gyroscope for indicating an angular rate, comprising, in combination: a flywheel; flexible means mounting said flywheel for rotation about a given axis in the absence of any angular deviation, said flexible means exerting a restraining force on said flywheel in response to an angular rate, urging the axis of rotation thereof back into alignment with said given axis; a member having a spherical surface secured to said flywheel for rotation therewith, the center of said spherical surface coinciding with the center of gravity of said flywheel; an indicating roller having a peripheral surface; means mounting said roller for rotation about at least two different axes with said peripheral surface in engagement with a point on said spherical surface falling on said given axis in the absence of any angular rate; and means for rotating said flywheel.

2. The subject matter of claim 1, including means for indicating the degree of rotation of said roller in response to a shifting of said point of engagement from said given axis when said flywheel is rotated and subject to an angular rate tending to shift the axis of rotation of said flywheel out of alignment with said given axis.

3. The subject matter of claim 2, in which said roller comprises a sphere, the degree of angular movement of said sphere about any one diametric axis constituting a function of any angular rate to which said flywheel is subject.

4. The subject matter of claim 3, including magnet means adjacent the periphery of said flywheel for exerting control moments on said flywheel.

5. The subject matter of claim 4, in which said magnet means constitute electromagnets circumferentially spaced about the periphery of said flywheel, said sphere having a portion thereof formed of electrical conducting material, the remaining portion being of electrically insulative material; contact fingers; means supporting said contact fingers in a position to engage the insulated portion of said sphere adjacent the border line of said electrically conducting material such that rotative movement of said sphere from a given position moves said electrically conducting material into contact with at least one of said fingers; means connecting said contacts to said magnetic means; and means energizing said conductive material to provide a signal in any one contact engaging said conductive material whereby a torque is applied to said flywheel by the magnetic means connected to said contact to rotate said sphere back to said given position.

6. The subject matter of claim 5, in which said means for supporting said contact fingers include pendulums responsive to changes in the direction of a gravitational field whereby said sphere can be maintained in a given constant position relative to the direction of said gravitational field.

References Cited in the file of this patent

UNITED STATES PATENTS

| | | |
|---|---|---|
| 1,890,831 | Smyth | Dec. 13, 1932 |
| 2,393,473 | Jones | Jan. 22, 1946 |
| 2,452,335 | Stoner | Oct. 26, 1948 |
| 2,585,120 | Harrington | Feb. 12, 1952 |
| 2,709,922 | Knutson | June 7, 1955 |